(12) United States Patent
Kita et al.

(10) Patent No.: US 9,129,357 B2
(45) Date of Patent: Sep. 8, 2015

(54) IMAGE PROCESSING APPARATUS, METHOD OF IMAGE PROCESSING, AND RECORDING MEDIUM STORING IMAGE PROCESSING PROGRAM

(71) Applicants: Koji Kita, Wakayama (JP); Yukiko Murata, Wakayama (JP); Takahiro Miyamoto, Wakayama (JP); Yumiko Nakagawa, Wakayama (JP); Tomoo Nakano, Wakayama (JP)

(72) Inventors: Koji Kita, Wakayama (JP); Yukiko Murata, Wakayama (JP); Takahiro Miyamoto, Wakayama (JP); Yumiko Nakagawa, Wakayama (JP); Tomoo Nakano, Wakayama (JP)

(73) Assignee: NK Works Co., Ltd. (JP)

( * ) Notice: Subject to any disclaimer, the term of this patent is extended or adjusted under 35 U.S.C. 154(b) by 254 days.

(21) Appl. No.: 13/727,197

(22) Filed: Dec. 26, 2012

(65) Prior Publication Data
US 2013/0170768 A1    Jul. 4, 2013

(30) Foreign Application Priority Data

Dec. 28, 2011    (JP) ................................. 2011-288767

(51) Int. Cl.
*G06T 5/00*    (2006.01)
*G06T 3/40*    (2006.01)

(52) U.S. Cl.
CPC ................. *G06T 5/001* (2013.01); *G06T 3/403* (2013.01)

(58) Field of Classification Search
USPC ......................................................... 382/266
See application file for complete search history.

(56) References Cited

U.S. PATENT DOCUMENTS 7,589,863 B2 *  9/2009  Kita ............................... 358/1.9
8,401,341 B2    3/2013  Miyamoto

FOREIGN PATENT DOCUMENTS

| JP | 2008271085 A | 11/2008 |
| JP | 2011049696 A | 3/2011 |
| JP | 2011076274 A | 4/2011 |

OTHER PUBLICATIONS

Notification of Reasons for Rejection from JPO Application No. 2011-288767 Issued: Jan. 6, 2015 7 pages.

* cited by examiner

*Primary Examiner* — Duy M Dang
(74) *Attorney, Agent, or Firm* — St. Onge Steward Johnston & Reens LLC (57) ABSTRACT

An image processing apparatus including an image processing unit and configured to generate an enlarged image of an original image. The image processing unit is configured to generate the enlarged image by sequentially and repeatedly executing an edge-enhancement and enlargement process on the original image. The edge-enhancement and enlargement process is a process for enhancing edges in an image while enlarging the image.

11 Claims, 9 Drawing Sheets

IMAGE PROCESSING APPARATUS, METHOD OF IMAGE PROCESSING, AND RECORDING MEDIUM STORING IMAGE PROCESSING PROGRAM

FIELD OF THE INVENTION

The present invention relates to an image processing apparatus, a method of image processing and a recording medium storing an image processing program.

BACKGROUND OF THE INVENTION

Generally, enlarging an image causes the image to be blurred. To address this problem, it is desirable to enhance edges in the enlarged image after enlarging the original image, and various technologies related to edge enhancement that should be performed on an enlarged image have conventionally been proposed (for example, see Patent JP 2011-49696A and JP 2008-271085A).

However, even though various edge enhancement processes are proposed, it is difficult for a user to determine which edge enhancement process to perform on a specific image, and it is not practical to prepare edge enhancement programs for various algorithms.

It is an object of the present invention to provide an image processing apparatus, a method of image processing and a recording medium storing an image processing program with which preferred enlarged images in which edges are enhanced can be easily obtained.

SUMMARY OF THE INVENTION

An image processing apparatus according to a first aspect includes an image processing unit and is configured to generate an enlarged image of an original image. The image processing unit is configured to generate the enlarged image by sequentially and repeatedly executing an edge-enhancement and enlargement process on the original image. The edge-enhancement and enlargement process is a process for enhancing an edge in an image while enlarging the image.

Here, to generate the enlarged image, the edge-enhancement and enlargement process is sequentially and repeatedly executed on the original image. That is to say, enlargement processing and edge enhancement processing are repeatedly executed. In other words, edge enhancement processing is executed a plurality of times while the original image is enlarged gradually so that the enlarged image with a desired enlargement factor is obtained. As a result, a preferred enlarged image is generated in which edges are enhanced more than when the edge-enhancement and enlargement process by the desired enlargement factor is executed once. Accordingly, it is possible to easily obtain a preferred enlarged image in which edges are enhanced.

An image processing apparatus according to a second aspect is the image processing apparatus according to the first aspect and further includes a receiving unit. The receiving unit is configured to receive an instruction to enlarge the original image. The image processing unit is configured to generate the enlarged image by sequentially and repeatedly executing the edge-enhancement and enlargement process on the original image in response to the above instruction.

Here, upon receipt of the user instruction, the edge-enhancement and enlargement process is automatically and repeatedly executed. Accordingly, by performing a simple operation, the user can obtain a preferred enlarged image in which edges are enhanced.

An image processing apparatus according to a third aspect is the image processing apparatus according to the second aspect, wherein the receiving unit is configured to receive an input indicating a number of repetitions of the edge-enhancement and enlargement process. The image processing unit is configured to generate the enlarged image by sequentially and repeatedly executing the edge-enhancement and enlargement process on the original image as many times as the number of repetitions.

Here, after the user has designated the number of repetitions, the edge-enhancement and enlargement process is automatically and repeatedly executed as many times as the number of repetitions. Accordingly, by performing a simple operation, the user can repeatedly execute the edge-enhancement and enlargement process.

An image processing apparatus according to a fourth aspect is the image processing apparatus according to the second aspect, wherein the receiving unit is configured to receive an input indicating an enlargement factor of a single cycle of the edge-enhancement and enlargement process. The image processing unit is configured to generate the enlarged image by sequentially and repeatedly executing the edge-enhancement and enlargement process by the enlargement factor on the original image.

Here, after the user has designated the enlargement factor, the edge-enhancement and enlargement process by that enlargement factor is automatically and repeatedly executed. Accordingly, by performing a simple operation, the user can enlarge the original image gradually.

An image processing apparatus according to a fifth aspect is the image processing apparatus according to the second aspect, wherein the receiving unit is configured to receive an input indicating an enlargement factor from the original image to the enlarged image. The image processing unit is configured to generate the enlarged image by the enlargement factor from the original image by sequentially and repeatedly executing the edge-enhancement and enlargement process on the original image.

Here, after the user has designated the final enlargement factor, the edge-enhancement and enlargement process is automatically and repeatedly executed, so that the enlarged image that is an enlargement of the original image by that enlargement factor is generated. Accordingly, by performing a simple operation, the user can obtain an enlarged image that has been enlarged by a desired enlargement factor.

An image processing apparatus according to a sixth aspect is the image processing apparatus according to the third aspect, wherein the receiving unit is configured to receive an input indicating an enlargement factor of a single cycle of the edge-enhancement and enlargement process. The image processing unit is configured to generate the enlarged image by sequentially and repeatedly executing the edge-enhancement and enlargement process by the enlargement factor on the original image.

Here, after the user has designated the enlargement factor, the edge-enhancement and enlargement process by that enlargement factor is automatically and repeatedly executed. Accordingly, by performing a simple operation, the user can enlarge the original image gradually.

An image processing apparatus according to a seventh aspect is the image processing apparatus according to the third aspect, wherein the receiving unit is configured to receive an input indicating an enlargement factor from the original image to the enlarged image. The image processing unit is configured to generate the enlarged image by the enlargement factor from the original image by sequentially and repeatedly executing the edge-enhancement and enlargement process on the original image.

Here, after the user has designated the final enlargement factor, the edge-enhancement and enlargement process is automatically and repeatedly executed, so that the enlarged image that is an enlargement of the original image by that enlargement factor is generated. Accordingly, by performing a simple operation, the user can obtain an enlarged image that has been enlarged by a desired enlargement factor.

A method of image processing according to an eighth aspect includes a first enlargement step and a second enlargement step. The first enlargement step is a step of executing an edge-enhancement and enlargement process on a first image, thereby generating a second image. The edge-enhancement and enlargement process is a process for enhancing an edge in an image while enlarging that image. The second enlargement step is a step of executing the edge-enhancement and enlargement process on the second image, thereby generating a third image.

Here, to generate an enlarged image, the edge-enhancement and enlargement process is sequentially and repeatedly executed on an original image. That is to say, enlargement processing and edge enhancement processing are repeatedly executed. In other words, edge enhancement processing is executed a plurality of times while the original image is enlarged gradually so that the enlarged image with the desired enlargement factor is obtained. As a result, a preferred enlarged image is generated in which edges are enhanced more than when the edge-enhancement and enlargement process by the desired enlargement factor is executed once. Therefore, a preferred enlarged image in which edges are enhanced can be easily obtained.

A recording medium storing an image processing program according to a ninth aspect is a non-transitory computer-readable recording medium storing an image processing program configured to cause a computer to execute a first enlargement step and a second enlargement step. The first enlargement step is a step of executing an edge-enhancement and enlargement process on a first image, thereby generating a second image. The edge-enhancement and enlargement process is a process for enhancing an edge in an image while enlarging that image. The second enlargement step is a step of executing the edge-enhancement and enlargement process on the second image, thereby generating a third image.

Here, to generate an enlarged image, the edge-enhancement and enlargement process is sequentially and repeatedly executed on an original image. That is to say, enlargement processing and edge enhancement processing are repeatedly executed. In other words, edge enhancement processing is executed a plurality of times while the original image is enlarged gradually so that the enlarged image with the desired enlargement factor is obtained. As a result, a preferred enlarged image is generated in which edges are enhanced more than when the edge-enhancement and enlargement process by the desired enlargement factor is executed once. Therefore, a preferred enlarged image in which edges are enhanced can be easily obtained.

Advantageous Effects of Invention

According to the present invention, to generate an enlarged image, enlargement processing and edge enhancement processing are repeatedly executed. In other words, edge enhancement processing is executed a plurality of times while an original image is enlarged gradually so that an enlarged image with a desired enlargement factor is obtained. As a result, a preferred enlarged image is generated in which edges are enhanced more than when the edge-enhancement and enlargement process by the desired enlargement factor is executed once. Accordingly, a preferred enlarged image in which edges are enhanced can be easily obtained.

REFERENCE SIGNS LIST

1 Image processing apparatus (computer)
2 Image processing program
41 Image processing unit
42 Parameter receiving unit (receiving unit)
F(0) Original frame (original image)
F(K) Enlarged frame (enlarged image)
K Number of repetitions
m Enlargement factor (enlargement factor of a single cycle of edge-enhancement and enlargement process)
M Enlargement factor (enlargement factor from original image to enlarged image)
S1 Enlargement routine
S2 Edge enhancement routine

DETAILED DESCRIPTION OF THE INVENTION

Hereinafter, an image processing apparatus, a method of image processing and a recording medium storing an image processing program according to an embodiment of the present invention will be described with reference to the drawings.

1. Brief Outline of Image Processing Apparatus

Figure 1:
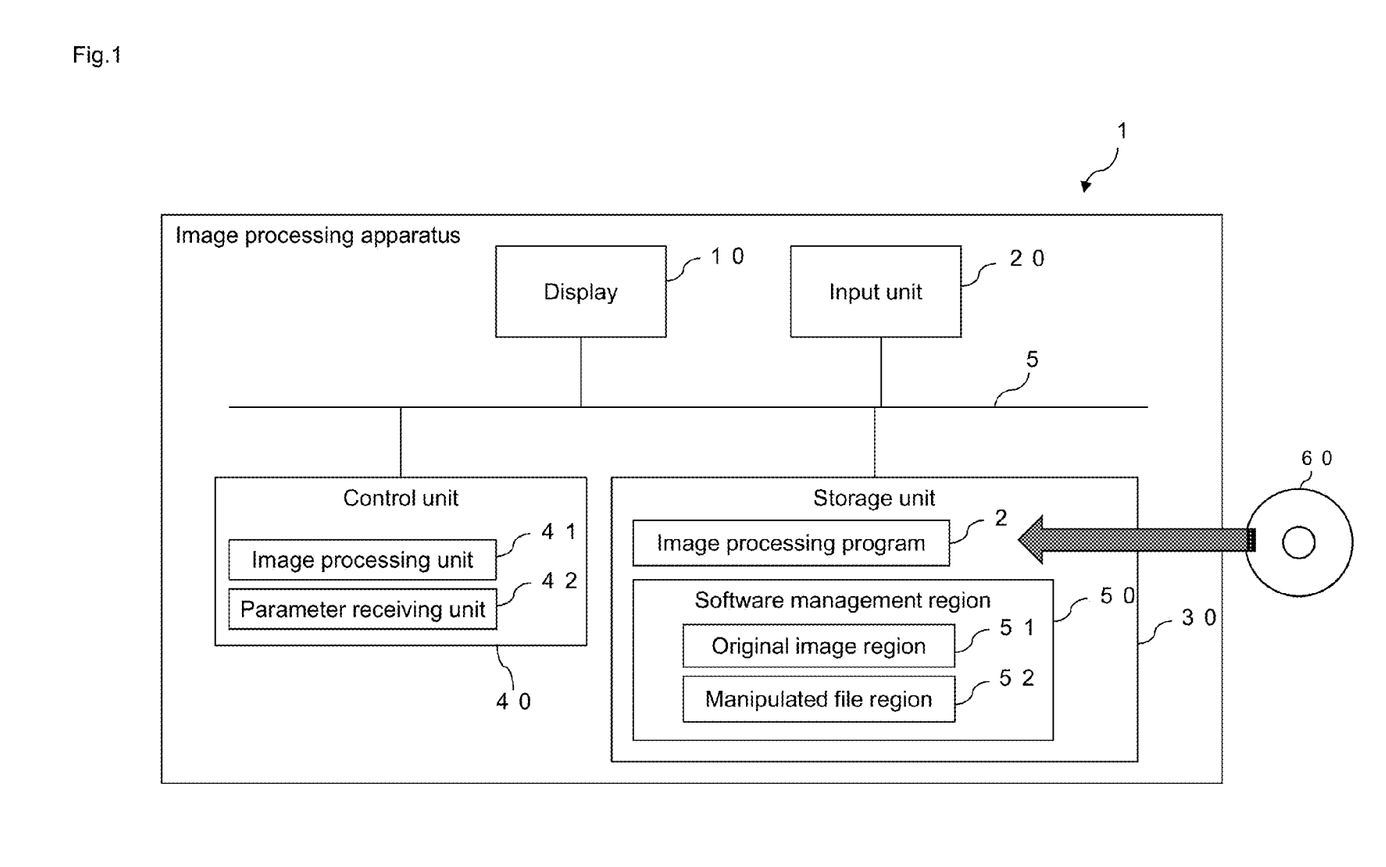
FIG. 1 is a block diagram of an image processing apparatus according to an embodiment of the present invention.

An image processing apparatus 1 shown in FIG. 1 is an embodiment of an image processing apparatus according to the present invention. The image processing apparatus 1 is a general-purpose personal computer. An image processing program 2, which is an embodiment of an image processing program according to the present invention, is installed in the image processing apparatus 1 from a computer-readable recording medium 60 such as a CD-ROM, a DVD-ROM, a Blu-ray disc, a USB memory, or the like. The image processing program 2 is application software for assisting image processing of moving images and still images. The image processing program 2 causes the image processing apparatus 1 to execute various steps included in operations that will be described later.

The image processing apparatus 1 has a display 10, an input unit 20, a storage unit 30, and a control unit 40. The display 10, the input unit 20, the storage unit 30, and the control unit 40 are connected to one another by a bus line 5 and can communicate with one another. In the present embodiment, the display 10 may be a liquid crystal display. The input unit 20 may be composed of a mouse, a keyboard, and the like. The storage unit 30 may be composed of a hard disk and the like. The control unit 40 may be composed of a CPU, a ROM, a RAM, and the like.

The display 10 displays screens that will be described later and the like to a user. The input unit 20 receives a user operation on the image processing apparatus 1.

The image processing program 2 is stored in the storage unit 30. A software management region 50 is set aside in the storage unit 30. The software management region 50 is a region that is used by the image processing program 2. An original image region 51 and a manipulated file region 52 are set aside in the software management region 50. The functions of these regions 51 and 52 will be described later.

The control unit 40 reads out and executes the image processing program 2 stored in the storage unit 30, thereby virtually operating as an image processing unit 41 and a parameter receiving unit 42. The operations of these units 41 and 42 will be described later.

2. Details of Configuration and Operation of Image Processing Apparatus

When the control unit 40 detects that the user has performed a predetermined operation through the input unit 20, the control unit 40 activates the image processing program 2. When the image processing program 2 is activated, a basic screen W1 (see FIG. 2) is displayed on the display 10. It should be noted that the control unit 40 controls the display of screens, windows, buttons, and all other elements displayed on the display 10.

2-1. Image Data Capture

Figure 2:
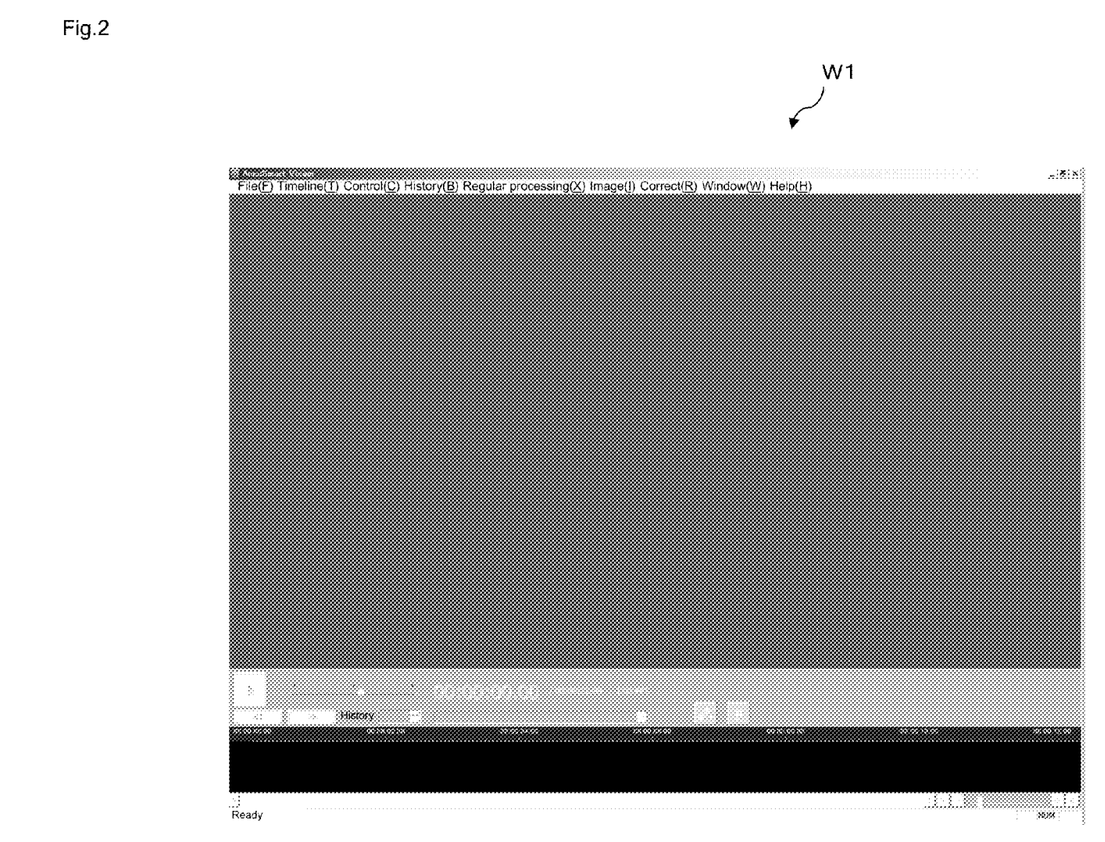
FIG. 2 shows a basic screen before image data is captured.

The basic screen W1 receives an instruction from the user to capture image data into the original image region 51. The image data captured into the original image region 51 will be a target of image processing that will be described later. The control unit 40 captures image data from a still image file or a moving image file into the original image region 51. It should be noted that in this specification, "still image file" refers to a data file in a still image format, and "moving image file" refers to a data file in a moving image format.

When capturing image data from a still image file, the user designates a still image file or a folder by operating the input unit 20. In the former case, the control unit 40 prompts the user to input an address path in the storage unit 30 and a file name of that still image file. In the latter case, the control unit 40 prompts the user to input an address path in the storage unit 30 and a folder name of that folder. After that, the control unit 40 stores the designated still image file or all the still image files within the designated folder in the original image region 51 as a still image file group. It should be noted that "group" as used herein is not limited to a plurality of elements, and the number of elements of the group may be one.

On the other hand, when capturing image data from a moving image file, the user inputs an address path in the storage unit 30 and a file name of a moving image file by operating the input unit 20. When the control unit 40 detects that the user has designated the moving image file, the control unit 40 displays a moving image capture window (not shown) such that this window is laid on the basic screen W1. The moving image capture window receives, from the user, the selection of a timeline of any length out of the entire timeline of the designated moving image file. When the control unit 40 detects that the user has selected the timeline of any length through the input unit 20, the control unit 40 generates a still image file group corresponding to that selection. This still image file group corresponds one-to-one to a frame group that is contained in a moving image of the timeline selected by the user. Afterward, the control unit 40 stores this still image file group in the original image region 51.

Accordingly, in the present embodiment, the target of image processing that will be described later is not a moving image file but a still image file. The still image file is captured into the original image region 51 on a file-by-file basis, on a folder-by-folder basis, or in the unit of the whole or a partial timeline of the moving image file.

2-2. Reproduction of Still Image File Group

When the still image file group is captured into the original image region 51, the control unit 40 displays a display window W2 (see FIG. 3) such that this window is laid on the basic screen W1. The display windows W2 is displayed for each capturing operation for capturing a still image file group into the original image region 51.

Figure 3:
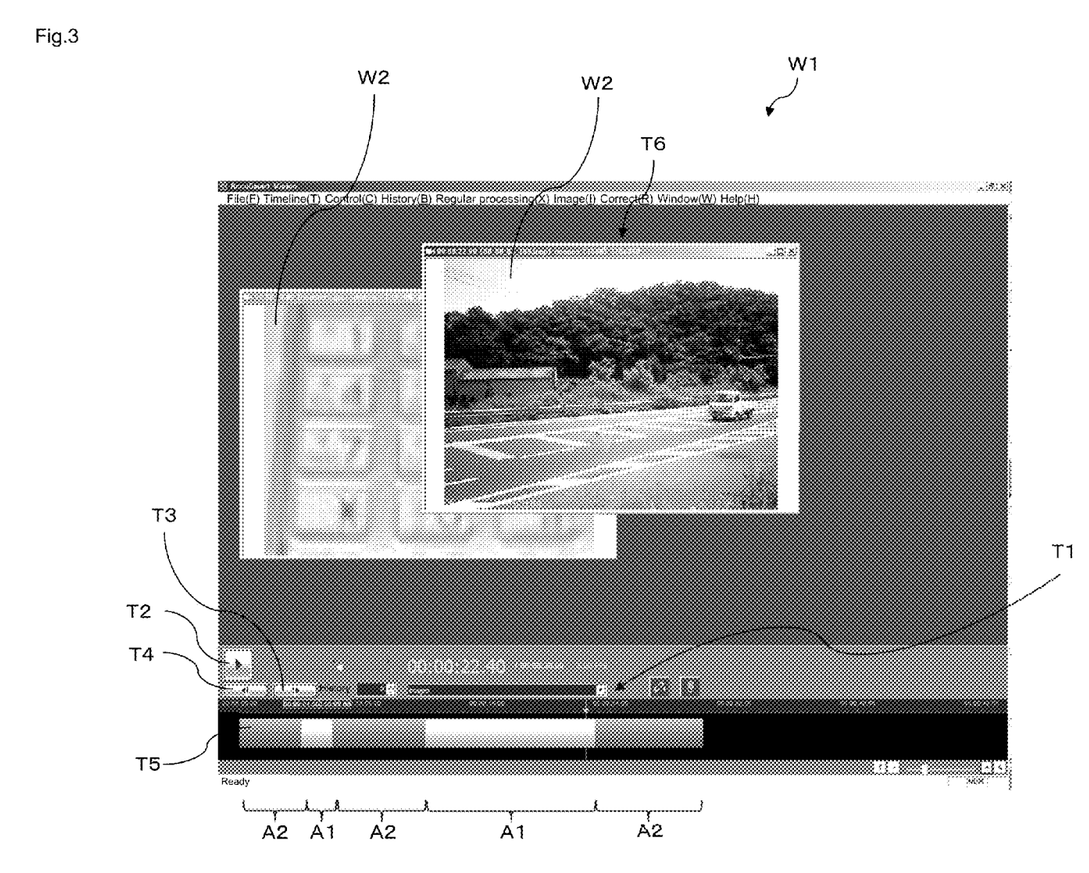
FIG. 3 shows the basic screen after image data has been captured.

In the display window W2, first, a single still image file (for example, a still image file corresponding to the first frame on the timeline) contained in the still image file group that has been captured into the original image region 51 is displayed. It should be noted that the control unit 40 recognizes that still image files contained in the still image file group are arranged along the timeline, even if the still image file group is derived from a still image file rather than being derived from a moving image file. The arrangement is automatically determined based on the attributes (file name, date and time of creation, date and time of update, and the like) of a file.

As will be described later, the frame displayed in the display window W2 changes in response to a user operation. The control unit 40 manages identification information of the frame that is currently displayed in the display window W2 in real time. As shown in FIG. 3, the control unit 40 determines the image size (the number of vertical pixels× the number of horizontal pixels) of the frame that is currently displayed in the display window W2, and displays the image size in an image size display area T6 within the border of that display window W2.

The control unit 40 can reproduce, within the display window W2, the still image file group corresponding to that display window W2 as a moving image. As shown in FIG. 3, the control unit 40 displays a window selection pull-down menu T1, a reproduce button T2, a frame forward button T3, a frame back button T4, and a timeline bar T5 on the basic screen W1.

Even when there is a plurality of display windows W2, only one of those display windows W2 is active. The window selection pull-down menu T1 receives the selection of which display window W2 is to be made active from the user. Hereinafter, a still image file group corresponding to an active display window W2 will be referred to as "active file group". Moreover, a frame that is currently displayed in an active display window W2 will be referred to as "active display frame".

The reproduce button T2 receives an instruction from the user to reproduce the active file group as a moving image. When the control unit 40 detects that the user has pressed the reproduce button T2 through the input unit 20, the control unit 40 displays frames of the active file group in the active display window W2 in such a manner that the frames are sequentially displayed along the timeline. It should be note that the reproduction begins with an active display frame at the point in time when the reproduce button T2 is pressed. Moreover, the reproduce button T2 receives an instruction from the user to stop reproduction. When the control unit 40 detects that the user has pressed the reproduce button T2 through the input unit 20 during reproduction, the control unit 40 fixes the display in the active display window W2 to an active display frame at that point in time.

The frame forward button T3 and the frame back button T4 respectively receive instructions from the user to change the active display frame to a frame directly after and directly before that active display frame along the timeline of the active file group.

The timeline bar T5 graphically represents the timeline of the active file group. The timeline bar T5 is equally divided in an extending direction of the bar into the same number of parts as the number of frames of the active file group. An "n"th divided region from the left on the timeline bar T5 corresponds to an "n"th frame of the active file group on the timeline ("n" is a natural number).

As shown in FIG. 3, in the timeline bar T5, divided regions A1 corresponding to a selected frame group and divided regions A2 corresponding to a non-selected frame group are displayed differently. "Selected frame group" refers to a frame group corresponding to a section that is currently selected on the timeline of the active file group. "Non-selected frame group" refers to a frame group corresponding to a section that is not currently selected on the timeline of the active file group. In the present embodiment, the region A1 is displayed in a light tone of color, and the region A2 is displayed in a dark tone of color.

The timeline bar T5 receives the selection of any section of the active file group on the timeline from the user. The section that is selected may be a continuous section or may be a discontinuous section. In other words, the user can select any number of any frames out of all the frames of the active file group by operating the timeline bar T5 through the input unit 20. Specifically, the user selects a divided region corresponding to a frame that he/she desires to select on the timeline bar T5. It is possible to select a plurality of divided regions at the same time. The image processing unit 41 recognizes the selected frame group as the target of image processing that will be described later. It should be noted that each time the user selects a divided region on the timeline bar T5, the active display frame is changed to a frame corresponding to the latest selected divided region.

2-3. Image Processing

Hereinafter, image processing of the selected frame group will be described. The image processing unit 41 can execute a plurality of image processing modules, such as noise removal, sharpness, brightness/contrast/saturation adjustment, image resolution, rotation, addition of characters/arrows/mosaics, super-resolution, and enlargement/super-resolution. The image processing modules are incorporated in the image processing program 2.

The user can select any modules of the image processing modules in any order and any number of times by operating the basic screen W1 through the input unit 20. If necessary, the user inputs a parameter that is used during execution of an image processing module at the same time as he/she selects that image processing module. Each time the image processing unit 41 detects that the user has selected an image processing module, the image processing unit 41 executes that image processing module on the selected frame group. It should be noted that executing an image processing module on a selected frame group means executing that image processing module on each frame contained in that selected frame group.

As image processing modules are executed on a frame sequentially, that is, once, twice, thrice, and so on, the frame is sequentially manipulated into a first-order frame, a second-order frame, a third-order frame, and so on. A zeroth-order frame corresponds to a still image file stored in the original image region 51. An (n+1)th-order frame corresponds to a still image file after an image processing module is executed once on an "n"th-order frame ("n" is an integer of 0 or more). As image processing modules are sequentially executed, still image files corresponding to the first-order and subsequent frames are sequentially generated. These still image files are stored in the manipulated file region 52 as separate files.

2-3-1. Enlargement/Super-Resolution

Figure 5:
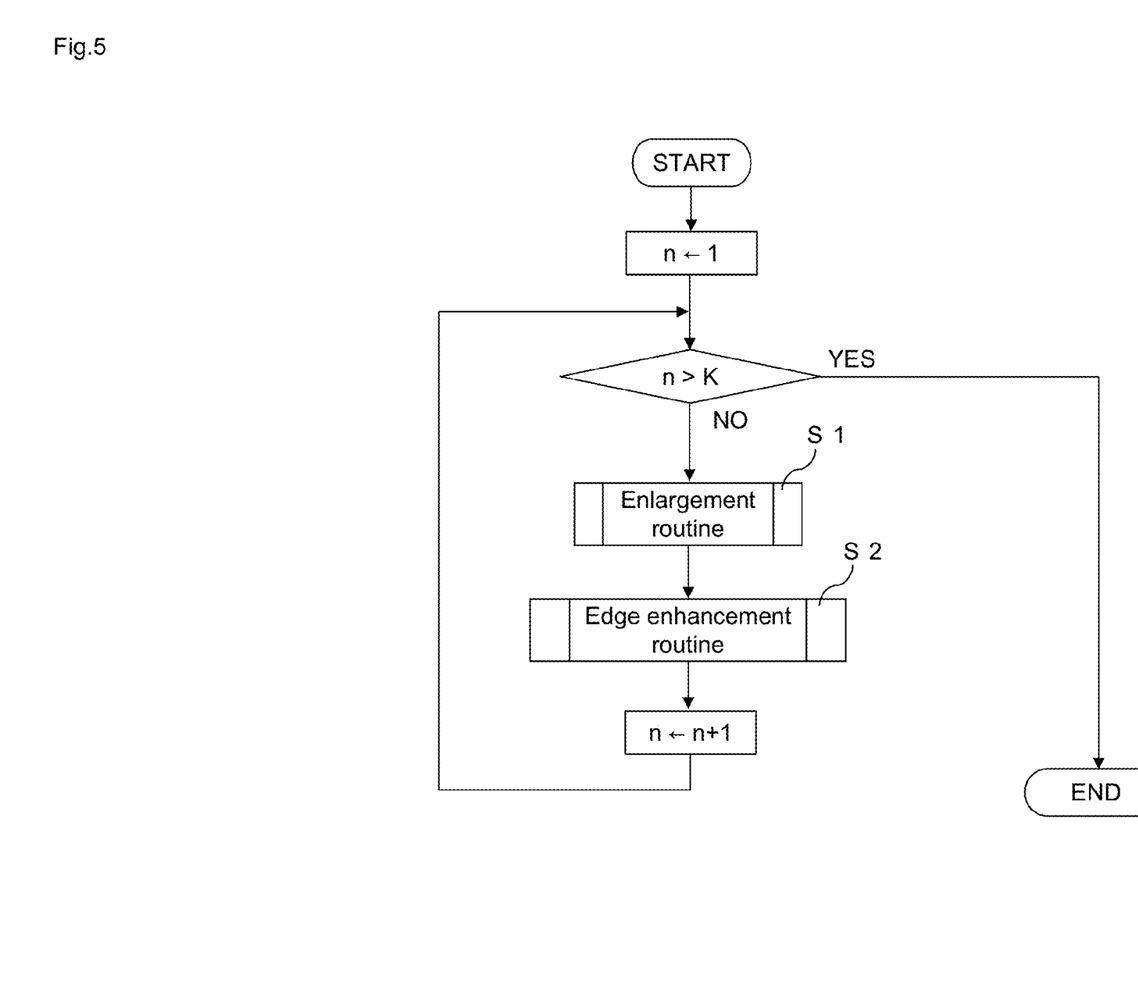
FIG. 5 is a flowchart of enlargement/super-resolution image processing.

Hereinafter, the flow of enlargement/super-resolution image processing will be described. Enlargement/super-resolution image processing, which is implemented as an enlargement/super-resolution image processing module, is a process in which an edge-enhancement and enlargement process is executed once or repeatedly a plurality of times. Generally, when an image is enlarged, the image may be blurred. The edge-enhancement and enlargement process is a process for enhancing edges in an image while enlarging that image. In other words, the edge-enhancement and enlargement process is a process by which while an image is enlarged, blurring that occurs due to enlargement is reduced. In the present embodiment, the edge-enhancement and enlargement process is a process in which an enlargement routine of step S1, which will be described later, is executed once and after that an edge enhancement routine of step S2, which will be described later, is executed once. The enlargement routine and the edge enhancement routine are each invoked as a subroutine during execution of the enlargement/super-resolution image processing module. Programs of the enlargement routine and the edge enhancement routine are incorporated in the image processing program 2.

As described above, enlargement/super-resolution image processing is executed on the selected frame group. Hereinafter, for the sake of simplicity, how the enlargement/super-resolution image processing module is executed on a single frame ("original frame" below) contained in the selected frame group will be described, but it should be understood that any other frames contained in the selected frame group are also processed in the same manner.

When the control unit 40 detects that the user has performed a predetermined operation on the basic screen W1 through the input unit 20, the control unit 40 displays an enlargement/super-resolution window W3 (see FIG. 4) such that this window is laid on the basic screen W1. The enlargement/super-resolution window W3 receives an input indicating a parameter that is used during execution of the enlargement/super-resolution image processing module. The enlargement/super-resolution window W3 displays a repetition number designation area B1, an enlargement factor designation area B2, an enlargement method designation area B3, an execution button B4, and a cancel button B5.

Figure 4:
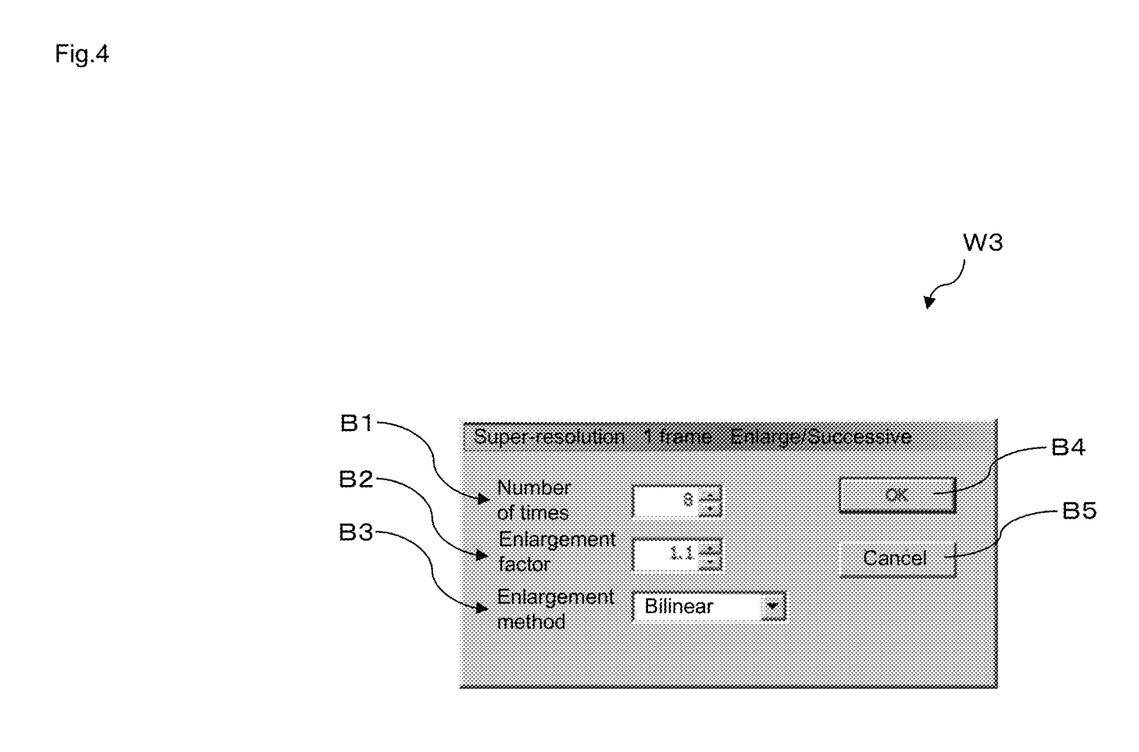
FIG. 4 shows an enlargement/super-resolution window.

The parameter receiving unit 42 receives an input indicating the number of repetitions K of the edge-enhancement and enlargement process of steps S1 and S2, which will be described later, from the user through the repetition number designation area B1. An integer value of 1 or more can be designated as the number of repetitions K. Moreover, the parameter receiving unit 42 receives an input indicating the enlargement factor "m" of a single cycle of the enlargement routine of step S1 from the user through the enlargement factor designation area B2. A numerical value of more than 0 can be designated as the enlargement factor "m". Moreover, the parameter receiving unit 42 receives the selection of any enlargement routine from a nearest neighbor method, a bilinear method, a bicubic method, and a Lanczos method from the user through the enlargement method designation area B3.

The execution button B4 receives an instruction from the user to execute enlargement/super-resolution image processing. The cancel button B5 receives an instruction from the user to cancel execution of enlargement/super-resolution image processing. When the image processing unit 41 detects that the execution button B4 has been pressed, the image processing unit begins enlargement/super-resolution image processing illustrated in FIG. 5. The contents that are set in the areas B1 to B3 at the time when the execution button B4 is pressed are used as parameters during execution of the enlargement/super-resolution image processing module.

When enlargement/super-resolution image processing illustrated in FIG. 5 is started, the image processing unit 41 executes the edge-enhancement and enlargement process of steps S1 and S2 as many times as the number of repetitions K designated in the repetition number designation area B1.

In step S1, the image processing unit 41 executes the enlargement routine on a target frame. "Target frame" refers to an original frame if the first cycle of the enlargement routine is currently executed or a frame after execution of the latest edge enhancement routine of step S2 if the second or subsequent cycle of the enlargement routine is currently executed. The image processing unit 41 enlarges the target frame by the enlargement factor "m" designated in the enlargement factor designation area B2 by executing the enlargement routine designated in the enlargement method designation area B3, and generates an intermediate target frame.

In the next step S2, the image processing unit 41 executes the edge enhancement routine on the intermediate target frame that has been generated in the directly preceding step S1. Specifically, in the present embodiment, the image processing unit 41 examines the extent of blurring of the intermediate target frame that has been generated in the directly preceding step S1, estimates an image before the image is blurred based on the extent of blurring, and generates the estimated image before being blurred as a new target frame. For example, the image processing unit 41 obtains a point spread function (PSF) of the intermediate target frame, has a frame that is the Fourier transform of the intermediate target frame pass through an inverse filter that is the inverse of a function obtained by Fourier-transforming the PSF, and obtains the inverse Fourier-transform of the frame that has passed through the inverse filter, thereby generating a frame in which blurring is reduced.

Figure 6:
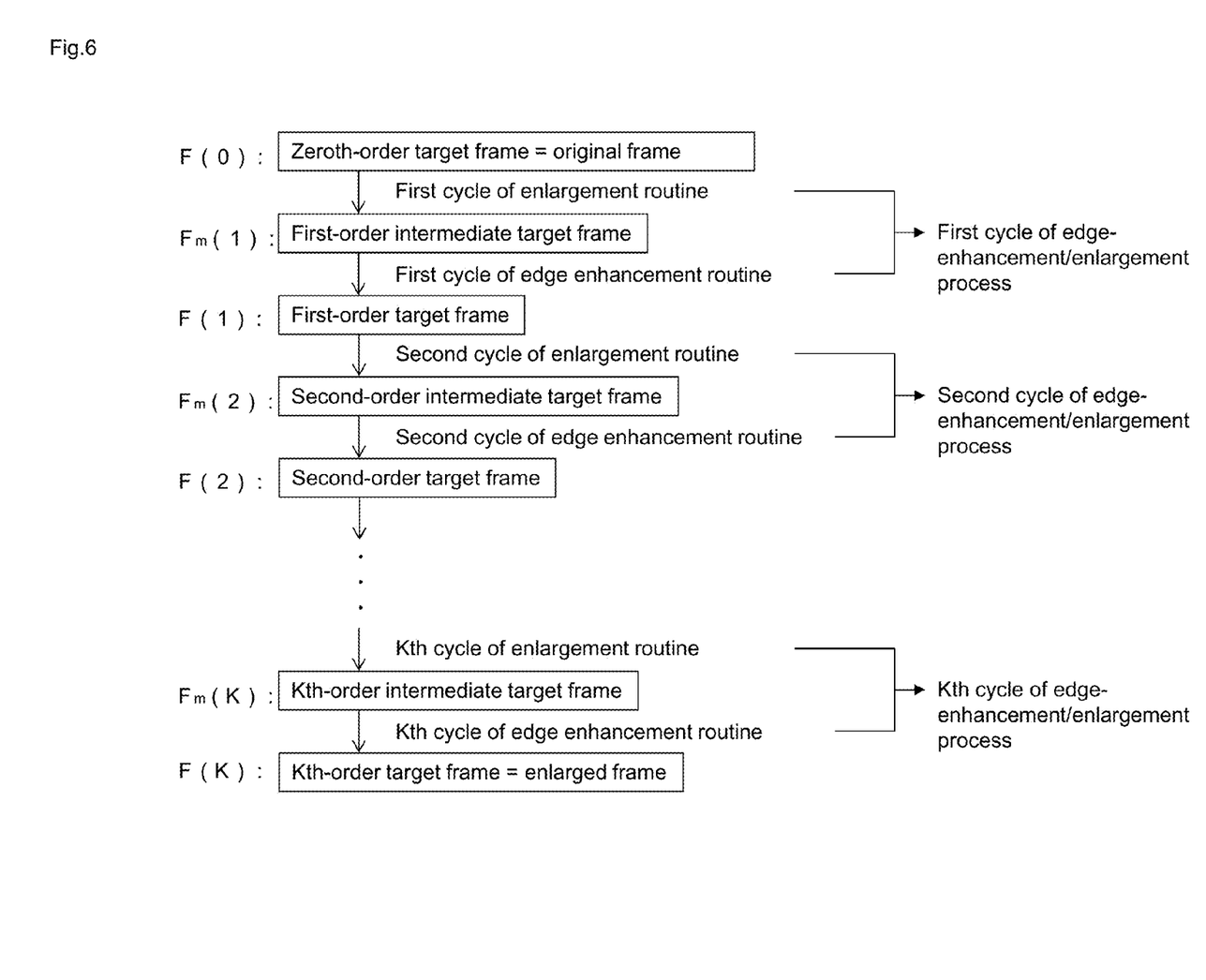
FIG. 6 illustrates frames that are sequentially generated by enlargement/super-resolution image processing.

How frames are sequentially generated by enlargement/super-resolution image processing can be illustrated as in FIG. 6. That is to say, assuming that "n" is a natural number, in step S1 of an "n"th cycle, the image processing unit 41 generates an "n"th-order intermediate target frame $F_m(n)$ by enlarging an (n−1)th-order target frame $F(n-1)$ by the enlargement factor "m". It should be noted that the zeroth-order target frame $F(0)$ is the original frame. In step S2 of the "n"th cycle, the image processing unit 41 generates an "n"th-order target frame $F(n)$ by sharpening edges in the "n"th-order intermediate target frame $F_m(n)$. Then, when steps S1 and S2 are executed as many times as the number of repetitions K, a Kth-order target frame $F(K)$ is generated as an enlarged frame, which is the final product. The enlarged frame $F(K)$ has an image size that is $m^K$ times larger than the original frame $F(0)$.

It should be noted that the control unit 40 stores not only the still image file of the enlarged frame $F(K)$, which is the final product, but also the still image files of intermediate target frames $F_m(1), F_m(2), \ldots, F_m(K)$ and target frames $F(1), F(2), \ldots, F(K-1)$, which are intermediate products, in the manipulated file region 52 as separate files from the still image file of the original frame $F(0)$.

When enlargement/super-resolution image processing has been finished, the control unit 40 displays the enlarged frame $F(K)$ in the active display window W2. However, the control unit 40 can display the original frame $F(0)$, the intermediate target frames $F_m(1), F_m(2), \ldots, F_m(K)$, and the target frames $F(1), F(2), \ldots, F(K-1)$ in the active display window W2 according to a relevant operation that is performed by the user on the basic screen W1. The control unit 40 can instantaneously change the active display frame among these frames $F_m(1), F_m(2), \ldots, F_m(K)$ and $F(0), F(1), \ldots, F(K)$. This is because the still image files of these frames $F_m(1), F_m(2), \ldots, F_m(K)$ and $F(0), F(1), \ldots, F(K)$ are stored as separate files in the software management region 50. Accordingly, the user can easily find a frame that seems to be optimal in terms of the extent of sharpening while instantaneously changing the active display frame among the frames $F_m(1), F_m(2), \ldots, F_m(K)$ and $F(0), F(1), \ldots, F(K)$.

Now, it is assumed that the user desires to generate an enlarged frame $F(K)$ by enlarging an original frame $F(0)$ by a factor M through enlargement/super-resolution image processing. In this case, the user can designate suitable values of "m" and K that satisfy $m^K = M$ in the areas B1, B2 on the enlargement/super-resolution window W3. For example, in the case where it is desired to generate an enlarged frame by enlarging the original frame by a factor of about 2, since $(1.1)^8 = 2.143 \ldots$, the user can designate "m", which is the enlargement factor of a single cycle of the enlargement routine, as 1.1× and K, which is the number of repetitions of the edge-enhancement and enlargement process, as 8.

3. Applications

As described above, irrespective of whether the image processing program 2 captures image data from a still image file or a moving image file, the image processing program 2 manages the captured image data as a still image file group. Therefore, the image processing program 2 can easily meet the user's request to perform image processing as desired by him/her on any frame in the same timeline. Moreover, the image processing program 2 has a function of reproducing the still image file group as a moving image. Consequently, even though the image data is treated as the still image file group in the image processing program 2, the user can recognize that image data as a moving image. Therefore, the image processing program 2 is particularly useful in instances where a moving image is analyzed, edited, and so on.

The image processing program 2 can deal with image processing on various kinds of moving images, and can be used, for example, in order for an organization such as the police to analyze a monitoring image from a security camera for investigation of a case. For example, there are cases where the registration number of a suspect's vehicle is recorded in a monitoring image from a security camera. However, the subject (the registration number of a suspect's vehicle) is often small and unclear in the monitoring image. The enlargement/super-resolution function of the present embodiment is particularly useful in sharpening a monitoring image (especially a necessary portion thereof) from a security camera while enlarging the monitoring image, thereby enabling the registration number and the like of a suspect's vehicle to be read.

4. Features

4-1

In the above-described embodiment, the image processing unit 41 can sequentially and repeatedly execute the edge-enhancement and enlargement process of steps S1 and S2 on an original frame when generating an enlarged frame by enlargement/super-resolution image processing. That is to say, the enlargement routine of step S1 and the edge enhancement routine of step S2 can be repeatedly executed. In other words, the image processing unit 41 can execute the edge enhancement routine a plurality of times while enlarging an original frame gradually by an enlargement factor "m" so as to obtain an enlarged frame with a desired enlargement factor M. As a result, a preferred enlarged frame can be generated in which edges are enhanced more than when the enlargement routine by the desired enlargement factor M is executed once and thereafter the edge enhancement routine is executed once.

As the method for generating an enlarged frame with a desired enlargement factor M, a method is also conceivable in which the enlargement routine by the desired enlargement factor M is executed once and thereafter the edge enhancement routine is executed a plurality of times. However, edge enhancement routines often create a high load. Generally, in many cases, edge enhancement routines called super-resolution create a high load. Thus, if a high-load edge enhancement routine is executed a plurality of times on a frame that was enlarged by an enlargement factor M and has a large image size, the computation time is extremely prolonged. However, even when the high-load edge enhancement routine is executed the same number of times as above, if the edge enhancement routine is executed the plurality of times while enlarging the original frame gradually by an enlargement factor "m" as in the above-described embodiment, the computation time can be significantly reduced. The reason for this is that the image size of frames serving as targets of earlier cycles of the edge enhancement routine of the plurality of cycles of the edge enhancement routine is small. It should be noted that naturally, a low-load edge enhancement routine may also be used in enlargement/super-resolution image processing according to the present invention.

4-2

In the above-described embodiment, the enlargement/super-resolution window W3 receives, simultaneously with the instruction to enlarge the original frame, the input indicating the number of repetitions K of the edge-enhancement and enlargement process and the enlargement factor "m" of a single cycle of the edge-enhancement and enlargement process from the user. Then, after the user has designated the number of repetitions K and the enlargement factor "m", the image processing unit 41 can automatically and repeatedly execute the edge-enhancement and enlargement process by the enlargement factor "m" as many times as the number of repetitions K according to the above instructions. Therefore, by performing a simple operation, the user can repeatedly execute the edge-enhancement and enlargement process while enlarging the original frame gradually.

It should be noted that the user can designate the number of repetitions K as 1 in the enlargement/super-resolution window W3 and execute enlargement/super-resolution image processing. Afterward, with respect to a frame after execution of this enlargement/super-resolution image processing, the user can again designate the number of repetitions K as 1 in the enlargement/super-resolution window W3 and execute enlargement/super-resolution image processing. In this manner, even if a method is employed in which each time a single cycle of the edge-enhancement and enlargement process is executed, a parameter is designated on the enlargement/super-resolution window W3, the same enlarged frame can be obtained.

5. Variations

Although an embodiment of the present invention has been described above, the present invention is not limited to the above embodiment, and various changes can be made thereto without departing from the gist of the present invention. For example, the following changes can be made.

5-1

The above-described embodiment was configured so that during a single cycle of the edge-enhancement and enlargement process, the edge enhancement routine of step S2 is executed after the enlargement routine of step S1 has been completed. That is, processing for enlarging an image and processing for enhancing edges were separated. However, it is also possible to use an algorithm in which processing for enlarging an image and processing for enhancing edges are integrated with each other.

5-2

The above-described embodiment was configured so that a nearest neighbor enlargement method, a bilinear enlargement method, a bicubic enlargement method, and a Lanczos enlargement method can be executed as the enlargement routine in step S1, however, a method other than these methods can also be executed as appropriate. Also, as the edge enhancement routine in step S2, for example, any methods for correcting blurring and shaking and enhancing edges, which are generally called sharpness or super-resolution, can be employed as appropriate.

5-3

The above-described embodiment was configured so that the number of repetitions K of the edge-enhancement and enlargement process and the enlargement factor "m" that is achieved by a single cycle of the edge-enhancement and enlargement process are designated as parameters of enlargement/super-resolution image processing. However, the method for designating a parameter of enlargement/super-resolution image processing is not limited to the aforementioned method, and for example, the following methods are conceivable.

For example, instead of the number of repetitions K and the enlargement factor "m", the enlargement/super-resolution window W3 may receive an input indicating a final enlargement factor M from the original frame to the enlarged frame. In this case, for example, the image processing unit 41 automatically calculates the number of repetitions K and the enlargement factor "m" that substantially satisfy the relationship $m^K=M$ from the designated enlargement factor M. Subsequently, the image processing unit 41 can execute enlargement/super-resolution image processing in the same manner as in the above-described embodiment in accordance with the automatically calculated number of repetitions K and enlargement factor "m".

Alternatively, the enlargement/super-resolution window W3 may receive only an input indicating the number of repetitions K, of the number of repetitions K and the enlargement factor "m". In this case, the enlargement factor "m" may be predetermined. Alternatively, the enlargement/super-resolution window W3 may receive only an input indicating the enlargement factor "m", of the number of repetitions K and the enlargement factor "m". In this case, the number of repetitions K may be predetermined. Alternatively, both the number of repetitions K and the enlargement factor "m" may be predetermined. In this case, the enlargement/super-resolution window W3 may be configured so as not to request the user to input any parameter.

5-4

The above-described embodiment was configured so that any image data captured into the original image region 51 is stored as a still image file. However, it is also possible to store the image data captured into the original image region 51 as a moving image file. Whether the image data in the original image region 51 is stored in a still image format or a moving image format may be user-selectable or may be automatically determined according to the format or the like of the source image data.

Furthermore, after that, if the moving image file is subjected to image processing, the image data after this image processing may also be stored in the format of the moving image file.

Example

6. Evaluation

Figure 7:
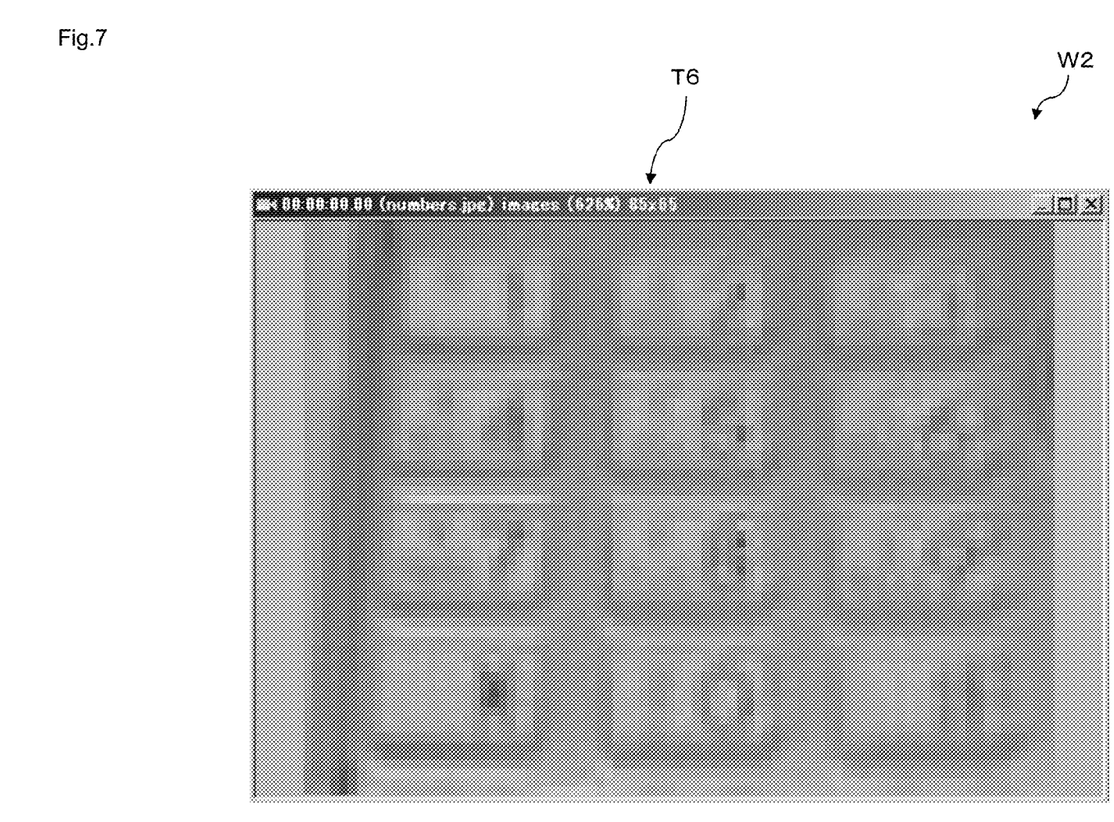
FIG. 7 shows an original frame.

Hereinafter, an example of the present invention will be described. However, the present invention is not limited to the example below. In this example, enlargement/super-resolution image processing was executed on an original frame shown in FIG. 7 under two different conditions below. The original frame shown in FIG. 7 has an image size of 85 vertical pixels×65 horizontal pixels. The original frame shown in FIG. 7 is an image obtained by photographing a telephone keypad in which the keys "1", "2", "3", "4", "5", "6", "7", "8", "9", "*", "0", and "#" are arranged in an array of 3 columns and 4 rows.

Under the first condition, the enlargement factor "m" was set as 1.1×, and the number of repetitions K was set as 8. A bilinear method was selected as the enlargement routine. Under the second condition, the enlargement factor "m" was set as 2.1×, and the number of repetitions K was set as 1. The bilinear method was selected as the enlargement routine. It should be noted that $(1.1)^8 = 2.143\ldots$, which is approximately 2.1.

Figure 8:
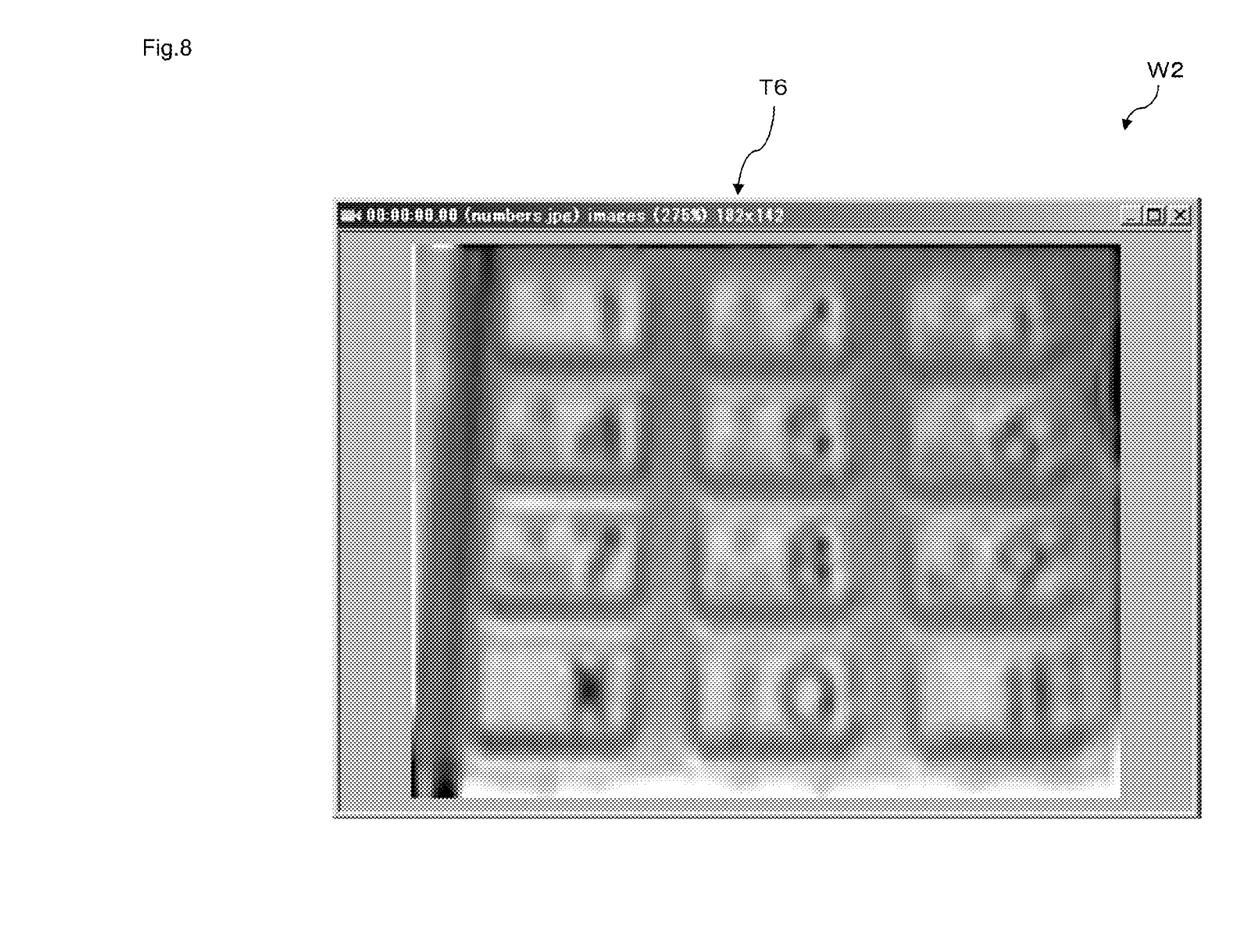
FIG. 8 shows an enlarged frame after edge-enhancement and enlargement process by an enlargement factor of 1.1× is repeatedly performed eight times on the original frame shown in FIG. 7.
Figure 9:
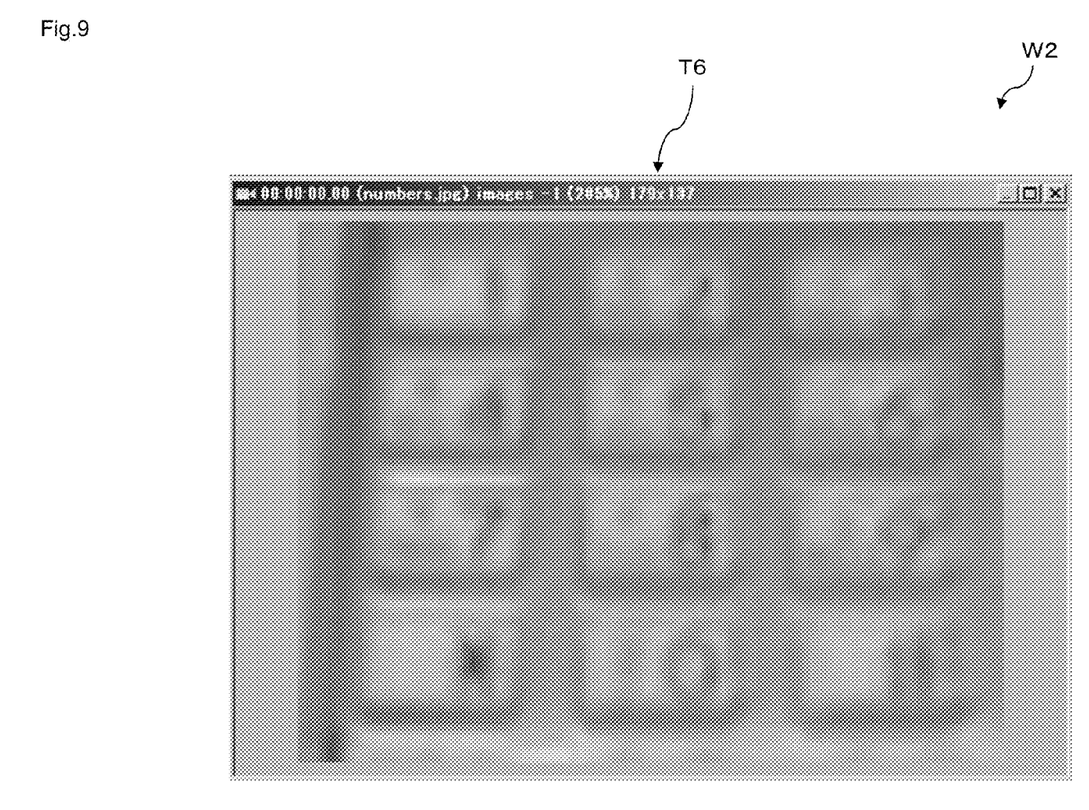
FIG. 9 shows an enlarged frame after edge-enhancement and enlargement process by an enlargement factor of 2.1× is performed once on the original frame shown in FIG. 7.

FIG. 8 shows a finally generated enlarged frame under the first condition, and FIG. 9 shows a finally generated enlarged frame under the second condition. The enlarged frame generated under the first condition has an image size of 182 vertical pixels×142 horizontal pixels, the enlarged frame generated under the second condition has an image size of 179 vertical pixels×137 horizontal pixels, and these sizes are substantially equal to each other. Comparison between the two images shows that the enlarged frame obtained by executing the edge-enhancement and enlargement process by the enlargement factor of 1.1× eight times so that the final enlargement factor was about 2.1× contains letters that are clearer to read than in the enlarged frame obtained by executing the edge-enhancement and enlargement process by the enlargement factor of 2.1× only once.

The invention claimed is:

1. An image processing apparatus configured to generate an enlarged image of an original image, comprising:
    an image processing unit configured to generate the enlarged image by sequentially and repeatedly executing an edge-enhancement and enlargement process n times n being an integer eater than or equal to 2, on the original image, the edge-enhancement and enlargement process enhancing an edge in an image while enlarging the image,
    wherein a first cycle of edge-enhancement and enlargement process is executed on the original image, and
    a "k"th cycle of edge-enhancement and enlargement process is executed on the e that has been created b a "k−1" th cycle of edge-enhancement and enlargement process, for any integer k greater than or equal to 2 and less than or equal to n.

2. The image processing apparatus according to claim 1, further comprising:
    an receiving unit configured to receive an instruction to enlarge the original image,
    wherein the image processing unit is configured to generate the enlarged image by sequentially and repeatedly executing the edge-enhancement and enlargement process on the original image in response to the instruction.

3. The image processing apparatus according to claim 2, wherein the receiving unit is configured to receive an input indicating a number of repetitions of the edge-enhancement and enlargement process, and
    wherein the image processing unit is configured to generate the enlarged image by sequentially and repeatedly executing the edge-enhancement and enlargement process on the original image as many times as the number of repetitions.

4. The image processing apparatus according to claim 2, wherein the receiving unit is configured to receive an input indicating an enlargement factor of a single cycle of the edge-enhancement and enlargement process, and
    wherein the image processing unit is configured to generate the enlarged image by sequentially and repeatedly executing the edge-enhancement and enlargement process by the enlargement factor on the original image.

5. The image processing apparatus according to claim 2, wherein the receiving unit is configured to receive an input indicating an enlargement factor from the original image to the enlarged image, and
    wherein the image processing unit is configured to generate the enlarged image by the enlargement factor from the original image by sequentially and repeatedly executing the edge-enhancement and enlargement process on the original image.

6. The image processing apparatus according to claim 3, wherein the receiving unit is configured to receive an input indicating an enlargement factor of a single cycle of the edge-enhancement and enlargement process, and
    wherein the image processing unit is configured to generate the enlarged image by sequentially and repeatedly executing the edge-enhancement and enlargement process by the enlargement factor on the original image.

7. The image processing apparatus according to claim 3, wherein the receiving unit is configured to receive an input indicating an enlargement factor from the original image to the enlarged image, and
    wherein the image processing unit is configured to generate the enlarged image by the enlargement factor from the original image by sequentially and repeatedly executing the edge-enhancement and enlargement process on the original image.

8. A method of image processing, comprising steps of:
    executing an edge-enhancement and enlargement process on a first image, the edge-enhancement and enlargement process enhancing an edge in an image while enlarging the image, thereby generating a second image, and
    executing the edge-enhancement and enlargement process on the second image, thereby generating a third image.

9. The method of image processing according to claim 8, further comprising a step of:
  receiving an instruction to enlarge the original image,
  wherein the steps of generating the second image and the third image are executed in response to the instruction, without any additional instruction.

10. A non-transitory computer-readable recording medium storing an image processing program configured to cause a computer to execute steps of:
  executing an edge-enhancement and enlargement process on a first image, the edge-enhancement and enlargement process enhancing an edge in an image while enlarging the image, thereby generating a second image; and
  executing the edge-enhancement and enlargement process on the second image, thereby generating a third image.

11. The non-transitory computer-readable recording medium according to claim 10, the image processing program configured to cause the computer to further execute a step of:
  receiving an instruction to enlarge the original image,
  wherein the steps of generating the second image and the third image are executed in response to the instruction, without any additional instruction.

\* \* \* \* \*